(12) United States Patent
Ishii et al.

(10) Patent No.: US 10,605,627 B2
(45) Date of Patent: Mar. 31, 2020

(54) ELECTROMAGNETIC INDUCTION TYPE POSITION DETECTOR

(71) Applicant: MITSUBISHI HEAVY INDUSTRIES MACHINE TOOL CO., LTD., Ritto-shi, Shiga (JP)

(72) Inventors: Koh Ishii, Ritto (JP); Katsuyoshi Takeuchi, Ritto (JP)

(73) Assignee: MITSUBISHI HEAVY INDUSTRIES MACHINE TOOL CO., LTD., Ritto-Shi (JP)

( * ) Notice: Subject to any disclaimer, the term of this patent is extended or adjusted under 35 U.S.C. 154(b) by 0 days.

(21) Appl. No.: 16/073,932

(22) PCT Filed: Apr. 13, 2016

(86) PCT No.: PCT/JP2016/061856
§ 371 (c)(1),
(2) Date: Jul. 30, 2018

(87) PCT Pub. No.: WO2017/134842
PCT Pub. Date: Aug. 10, 2017

(65) Prior Publication Data
US 2019/0041238 A1 Feb. 7, 2019

(30) Foreign Application Priority Data

Feb. 3, 2016 (JP) .................. 2016-018530

(51) Int. Cl.
*G01D 5/20* (2006.01)
*G01B 7/00* (2006.01)
*H01F 30/08* (2006.01)

(52) U.S. Cl.
CPC ............. *G01D 5/20* (2013.01); *G01B 7/003* (2013.01); *G01D 5/2053* (2013.01); *H01F 30/08* (2013.01)

(58) Field of Classification Search
USPC ............................ 324/207.16, 207.17, 220
See application file for complete search history.

(56) References Cited

U.S. PATENT DOCUMENTS

| 5,815,091 A | 9/1998 | Dames et al. |
| 6,005,387 A | 12/1999 | Andermo et al. |

(Continued)

FOREIGN PATENT DOCUMENTS

| JP | 10-500481 A | 1/1998 |
| JP | 10-318781 A | 12/1998 |

(Continued)

OTHER PUBLICATIONS

International Preliminary Report on Patentability and English translation of the Written Opinion of the International Searching Authority (PCT/IB/338, PCT/IB/373 and PCT/ISA/237) dated Aug. 16, 2018 for Application No. PCT/JP2016/061856.

(Continued)

*Primary Examiner* — Vincent Q Nguyen
(74) *Attorney, Agent, or Firm* — Birch, Stewart, Kolasch & Birch, LLP

(57) ABSTRACT

A transmission winding portion having a positive-polarity loop and a negative-polarity loop alternately formed so as to partially overlap with each other in the extending direction of a scale, arrangement of the positive-polarity loop and the negative-polarity loop being adjusted such that the positive-polarity loop and the negative-polarity loop on both sides with respect to the intermediate position in the longitudinal direction of the transmission winding portion are inverted; a first reception winding that covers the transmission winding portion in the width direction of the scale, that has a length, corresponding to the cycle of the cycle pattern of the transmission winding portion, and that is formed into a rectangular pattern; a second reception winding having a shape symmetrical to the first reception winding with respect (Continued)

to the intermediate position in the longitudinal direction of the transmission winding portion.

3 Claims, 1 Drawing Sheet

(56) References Cited

U.S. PATENT DOCUMENTS

| | | | |
|---|---|---|---|
| 2005/0225320 A1* | 10/2005 | Lee | G01D 5/2053 324/207.17 |
| 2006/0232269 A1 | 10/2006 | Sills et al. | |
| 2008/0204116 A1 | 8/2008 | James | |

FOREIGN PATENT DOCUMENTS

| | | | |
|---|---|---|---|
| JP | 2006-513409 A | 4/2006 |
| JP | 2008-509419 A | 3/2008 |
| JP | 2015-145790 A | 8/2015 |
| WO | WO 95/31696 A1 | 11/1995 |
| WO | WO 2004/061759 A2 | 7/2004 |
| WO | WO 2006/016147 A2 | 2/2006 |
| WO | WO 2015/115054 A1 | 8/2015 |

OTHER PUBLICATIONS

International Search Report and Written Opinion of the International Searching Authority (PCT/ISA/210 amd PCT/ISA/237) dated Jun. 7, 2016 for Application No. PCT/JP2016/061856 with an English translation of the International Search Report.

* cited by examiner

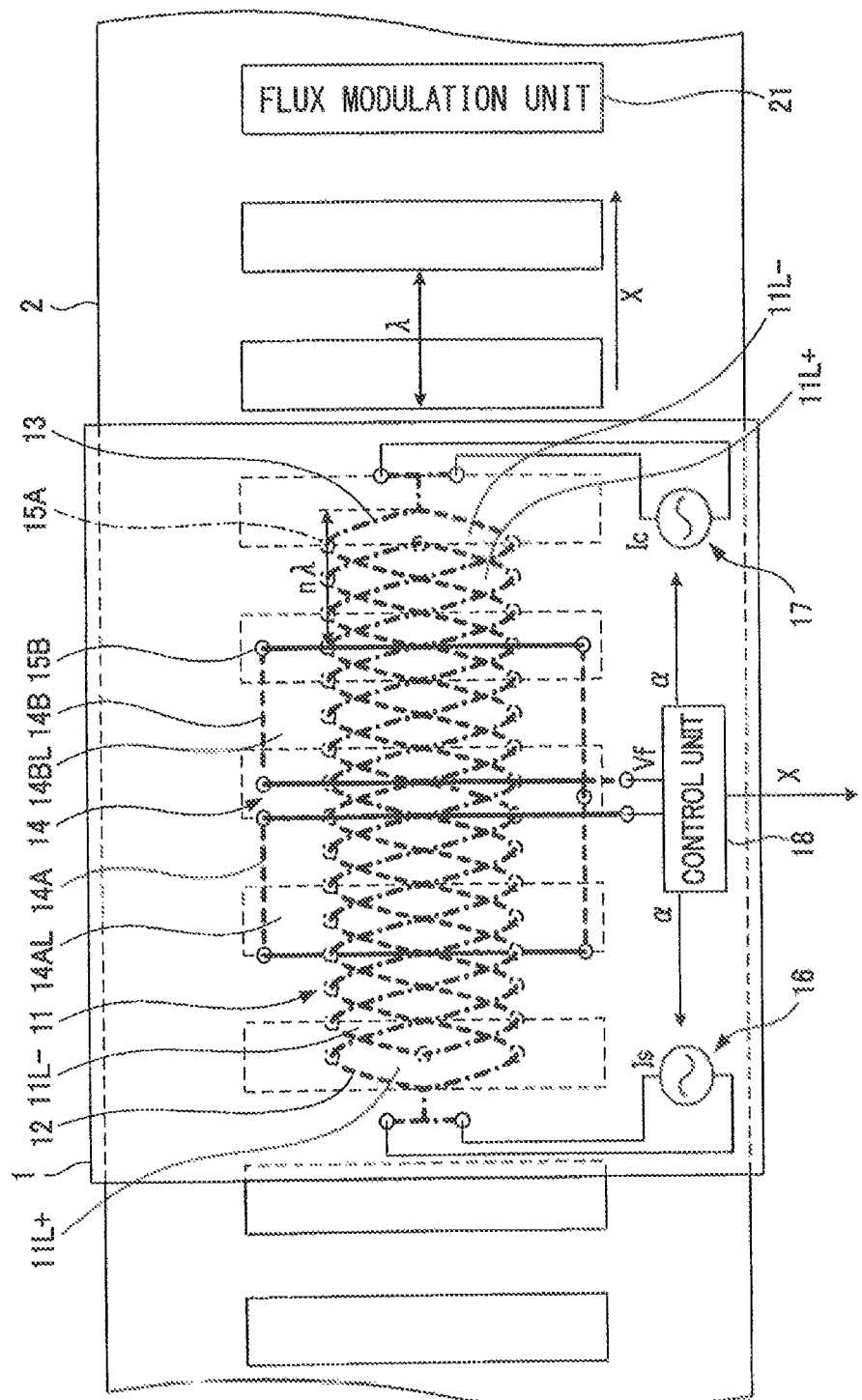

ELECTROMAGNETIC INDUCTION TYPE POSITION DETECTOR

BACKGROUND OF INVENTION

Field of Invention

The present invention relates to an electromagnetic induction type position detector.

Background Art

An electromagnetic induction type position detector is applied to position detection in various machines such as a machine tool, an automobile, a robot, and the like, and there are a linear type scale and a rotary type scale. The linear type scale is installed on a moving body such as a table of a machine tool to detect a linear moving position of the moving body, and the rotary type scale is installed on a moving body (a rotating body) such as a rotary table of a machine tool to detect a rotational position (a rotational angle) of the moving body.

The linear type scale and the rotary type scale detect a position by electromagnetic induction of patterns disposed so as to face each other in parallel to each other. The linear type scale has a slider which is a primary-side member and a scale which is a secondary-side member. The detection principle of the rotary type scale is also the same as that of the linear type scale, and a stator and a rotor of the rotary type scale respectively correspond to the slider and the scale of the linear type scale.

In the related art of a linear type scale described in PTL 1 described below, if an excitation signal is provided from an excitation signal generator to a transmission winding in a slider, an eddy current is generated in a flux modulation unit in a scale, and as a result, an induced voltage is generated in a reception winding in the slider. Then, the position of the slider can be detected based on a change of the voltage.

CITATION LIST

Patent Literature

[PTL 1] Japanese Unexamined Patent Application Publication No. 10-318781

SUMMARY OF INVENTION

Technical Problem

In the above PTL 1, the following (1) and (2) are mentioned as problems of the related art.

(1) The magnetic field which is generated by providing the excitation signal to the transmission winding directly induces voltage in a positive-polarity loop and a negative-polarity loop (the reception winding). The positive-polarity loop and the negative-polarity loop are wound in opposite directions, and therefore, the induced voltage of the reception winding is nominally canceled out. However, in fact, an error in manufacturing disrupts a balance, and thus an unnecessary offset component is generated in the induced voltage of the reception winding, so that the accuracy of position detection decreases.

(2) All the flux modulation units which are present within the magnetic field which is generated by the transmission winding cause spatial modulation of the same polarity in the magnetic field and have large offsets. The offset is a theoretical offset in which the induced voltage of the slider is not centered at 0 but centered on a predetermined value and fluctuates from the maximum value to the minimum value always with the same polarity (positive or negative), unlike the offset which is caused by the error in manufacturing in the above (1). In a case where the offset is present, the offset has to be taken into consideration when performing the position detection. However, the value of the offset changes according to the width (gap) between the slider and the stator, and therefore, it is necessary to perform the measurement of the gap by separately providing a detection device.

The above PTL 1 discloses a technique in which in order to reduce the offset of the induced voltage which is the problem in the above (1) and (2), two transmission winding portions (magnetic field generating loops) having shapes symmetrical to each other are provided outside the reception winding in a reading head (the slider), whereby the transmission winding portions cancel the voltages which are induced in the positive-polarity loop and the negative-polarity loop of the reception winding, thereby reducing the offset, and first and second coupling loops are provided in the scale, whereby the magnetic flux of the scale part is also canceled, so that the offset can be reduced.

However, in the technique disclosed in the above PTL 1, the two transmission winding portions having shapes symmetrical to each other have to be provided outside the reception winding, and thus a large space is required.

Therefore, the present invention has an object to provide an electromagnetic induction type position detector in which it is possible to achieve compactification while achieving higher accuracy by reducing an offset of an induced voltage.

Solution to Problem

An electromagnetic induction type position detector according to a first aspect of the present invention which solves the above problem includes:

a primary-side member having a transmission winding portion which generates a magnetic field by an electric current which is provided from an alternating-current power supply, and a reception winding portion which is disposed so as to overlap the transmission winding portion with an insulating layer interposed therebetween;

a secondary-side member having a flux modulation unit that generates an induced voltage in the reception winding portion by an eddy current which is generated by the magnetic field of the transmission winding portion; and a control unit that performs position detection, based on the induced voltage, in which the transmission winding portion has a first transmission winding having a shape in which a periodic pattern extending toward one side in an extending direction of the secondary-side member is folded at an end portion of a predetermined period to form a positive-polarity loop and a negative-polarity loop, and a second transmission winding which overlaps the first transmission winding with an insulating layer interposed therebetween and has a shape in which a periodic pattern extending toward the other side in the extending direction of the secondary-side member and having the same period as the periodic pattern of the first transmission winding is folded at an end portion of a predetermined period to form the positive-polarity loop and the negative-polarity loop, the positive-polarity loop and the negative-polarity loop are alternately formed while partially overlapping each other in the extending direction of the secondary-side member and are adjusted such that dispositions of the positive-polarity loop and the negative-polarity loop on both sides with respect to an intermediate position in a longitudinal direction of the transmission winding portion are inverted to each other, the reception winding portion has a first reception winding formed in a rectangular pattern which covers the transmission winding portion in a width direction of the secondary-side member and has a length corresponding to a period of the periodic pattern of each of the first transmission winding and the second transmission winding in the extending direction of the secondary-side member, and a second reception winding having a shape symmetrical to the first reception winding with the intermediate position in the longitudinal direction of the transmission winding portion as a center, and connected to the first reception winding, a plurality of the flux modulation units are arranged in the extending direction of the secondary-side member and face the transmitting winding portion and the reception winding portion, and the alternating-current power supply has a first alternating-current power supply which supplies an electric current Is to the first transmission winding, and a second alternating-current power supply which supplies an electric current Ic to the second transmission winding.

In an electromagnetic induction type position detector according to a second aspect of the present invention which solves the above problem, in the electromagnetic induction type position detector according to the first aspect of the present invention, a period of the periodic pattern of each of the first transmission winding and the second transmission winding is set to be nλ, the first transmission winding and the second transmission winding overlap each other so as to be shifted from each other by a quarter period, the plurality of flux modulation units are arranged every λ, the electric current Is is set to be $Is=-I\sin(2\pi\alpha/\lambda)\sin(\omega t)$, the electric current Ic is set to be $Ic=I\cos(2\pi\alpha/\lambda)\sin(\omega t)$, and the control unit controls the first alternating-current power supply and the second alternating-current power supply and performs the position detection by adjusting α such that the induced voltage Vf becomes zero and making X equal to α;

here, Is is magnitude of the electric current Is, Ic is magnitude of the electric current Ic, λ is a length of one pitch of the flux modulation unit, ω is an angular frequency of an alternating current, t is a time, and α is a parameter.

In an electromagnetic induction type position detector according to a third aspect of the present invention which solves the above problem, in the electromagnetic induction type position detector according to the second aspect of the present invention, the periodic pattern of each of the first transmission winding and the second transmission winding is formed such that interlayer connection wires penetrating the insulating layer are provided at positions corresponding to a maximum value and a minimum value and a folded position of an end portion and a transition from an N-th layer to an N+1-th layer and a transition from the N+1-th layer to the N-th layer are alternately performed at the interlayer connection wires.

Advantageous Effects of Invention

According to the electromagnetic induction type position detector relating to the present invention, it becomes possible to achieve compactification while achieving higher accuracy by reducing an offset of an induced voltage.

BRIEF DESCRIPTION OF THE DRAWINGS

FIG. 1 is a circuit diagram for describing an electromagnetic induction type position detector according to Example 1 of the present invention.

DETAILED DESCRIPTION OF THE INVENTION

Hereinafter, an electromagnetic induction type position detector according to the present invention will be described using the drawing as an example.

EXAMPLE 1

FIG. 1 is a circuit diagram for describing an electromagnetic induction type position detector according to this example. The electromagnetic induction type position detector according to this example is mainly provided with a transmission winding portion 11, a reception winding portion 14, a first alternating-current power supply 16, a second alternating-current power supply 17, and a control unit 18 provided in a slider 1 (a primary-side member), and a flux modulation unit (an electrode) 21 provided in a scale 2 (a secondary-side member).

The slider 1, which is a movable part, faces the scale 2, which is a fixed part, with a certain distance (a gap g (not shown)) therebetween and is movable in an extending direction of the scale 2. Further, each of at least the transmission winding portion 11 and the reception winding portion 14 in the slider 1 is formed by, for example, a printed circuit board, and an insulating layer (not shown) is provided between the respective lines, so that a state where insulation is maintained is created.

The transmission winding portion 11 generates a magnetic field by an electric current which is provided from an alternating-current power supply, and has a first transmission winding 12 and a second transmission winding 13. The first transmission winding 12 has a shape in which a sinusoidal periodic pattern extending toward one side in a movement direction of the slider 1 (the extending direction of the scale 2) is folded at an end portion of a predetermined period to form a positive-polarity loop 11L+ and a negative-polarity loop 11L−.

Further, the second transmission winding 13 overlaps the first transmission winding 12 and has a shape in which a sinusoidal periodic pattern extending toward the other side in the movement direction of the slider 1 is folded at an end portion of a predetermined period to form the positive-polarity loop 11L+ and the negative-polarity loop 11L−.

A thick dot-and-dash line in FIG. 1 shows a pattern formed in an N-th layer, and a thick broken line in FIG. 1 shows a pattern formed in an N+1-th layer. In the sinusoidal periodic pattern of each of the first transmission winding 12 and the second transmission winding 13, interlayer connection wires (through-holes, via holes, or the like) 15A penetrating the insulating layer are provided at positions corresponding to the maximum value and the minimum value and a folded position of the end portion.

Further, each of the first transmission winding 12 and the second transmission winding 13 is formed so as to alternately transition from the N-th layer to the N+1-th layer and from the N+1-th layer to the N-th layer at the interlayer connection wire 15A portion, and the first transmission winding 12 and the second transmission winding 13 overlap each other with the insulating layer interposed therebetween so as to be shifted from each other by a quarter period.

The transmission winding portion 11 is configured in this manner, whereby the positive-polarity loop 11L+ and the negative-polarity loop 11L− are alternately formed while partially overlapping each other in the movement direction of the slider 1. Further, the sinusoidal periodic pattern of each of the first transmission winding 12 and the second transmission winding 13 is adjusted such that the dispositions of the positive-polarity loop 11L+ and the negative-polarity loop 11L− on both sides with respect to an intermediate position in a longitudinal direction of the transmission winding portion 11 are in a mutually inverted state.

Further, all the periods of the first transmission winding 12 and the second transmission winding 13 are set to be n$\lambda$ (n: natural number) ($\lambda$ will be described later).

The reception winding portion 14 has a first reception winding 14A and a second reception winding 14B. The first reception winding 14A is formed in a rectangular pattern which covers the transmission winding portion 11 to have a length equal to or larger than that of the transmission winding portion 11 in a width direction of the slider 1 (a width direction of the scale 2) and has a length corresponding to the period n$\lambda$ of each of the first transmission winding 12 and the second transmission winding 13 in the movement direction of the slider 1. The second reception winding 14B has a shape symmetrical to the first reception winding 14A with the intermediate position in the longitudinal direction of the transmission winding portion 11 as the center.

In this way, a reception loop 14AL which is formed by the rectangular pattern of the first reception winding 14A and a reception loop 14BL which is formed by the rectangular pattern of the second reception winding 14B have polarities inverted with the intermediate position in the longitudinal direction of the transmission winding portion 11 as the center.

Further, one ends of the first reception winding 14A and the second reception winding 14B are connected to each other and the other ends are connected to the control unit 18. Further, the distance between the first reception winding 14A and the second reception winding 14B is set to be $\lambda/4$ in FIG. 1. However, this example is not limited thereto (the distance may be set to be zero and overlap portions of the patterns may be formed in different layers).

In each of the first reception winding 14A and the second reception winding 14B, a thick broken line in FIG. 1 shows a state where each of the first reception winding 14A and the second reception winding 14B is disposed in the N+1-th layer, and a thick solid line portion in FIG. 1 shows a state where each of the first reception winding 14A and the second reception winding 14B is disposed in the N−1-th layer. In each of the first reception winding 14A and the second reception winding 14B, the patterned layer is transitioned by an interlayer connection wire 15B formed at each apex of the rectangular pattern, the side extending in the width direction of the scale 2 is formed in the N−1-th layer, and the side extending in the extending direction of the scale 2 is formed in the N+1-th layer.

With such a configuration, the reception winding portion 14 is patterned so as to cover the transmission winding portion 11 in the width direction of the slider 1 while preventing the contact with the transmission winding portion 11.

The order of the layers (on the printed circuit board) on which the transmission winding portion 11 and the reception winding portion 14 are patterned does not need to be limited, and it is favorable if the first transmission winding 12, the second transmission winding 13, and the reception winding portion 14 are patterned with an insulating layer interposed therebetween.

Further, the first alternating-current power supply supplies an electric current Is to the first transmission winding 12, and the second alternating-current power supply 17 supplies an electric current Ic to the second transmission winding 13.

The electric currents Is and Ic are defined by the following expressions (1) and (2), respectively.

$$Is = -I\sin(2\pi\alpha/\lambda)\sin(\omega t) \quad (1)$$

$$Ic = I\cos(2\pi\alpha/\lambda)\sin(\omega t) \quad (2)$$

(Is: magnitude of the electric current Is, Ic: magnitude of the electric current Ic, $\lambda$: length of one pitch of the flux modulation unit 21, $\omega$: angular frequency of an alternating current, t: time, $\alpha$: parameter)

The control unit 18 controls the first alternating-current power supply 16 and the second alternating-current power supply 17. Further, the control unit 18 adjusts the parameters $\alpha$ of the electric currents Is and Ic such that the voltage Vf which is generated in a terminal of the reception winding portion 14 is zero. Further, the control unit 18 performs position detection by making a position X equal to $\alpha$.

The flux modulation unit (electrode) 21 generates an induced voltage in the reception winding portion 14 by an eddy current which is generated by the magnetic field of the transmission winding portion 11, and may be, for example, a copper pattern, and a plurality of flux modulation units (electrodes) 21 are arranged every $\lambda$, in the extending direction of the scale 2 and face the transmission winding portion 11 and the reception winding portion 14.

The above is the configuration of the electromagnetic induction type position detector according to this example. Hereinafter, an operation of the electromagnetic induction type position detector according to this example will be described.

First, the electric currents Is and Ic are supplied from the first alternating-current power supply 16 and the second alternating-current power supply 17 of the slider 1 to the transmission winding portion 11. Then, an eddy current is generated in the flux modulation unit 21 of the scale 2, so that the voltage Vf is generated in the terminal of the reception winding portion 14 of the slider 1.

At this time, for example, if the positive-polarity loop 11L+ of the transmission winding portion 11 overlaps the flux modulation unit 21 of the scale 2, a magnetic flux in a direction canceling the magnetic flux which is generated from the positive-polarity loop 11L+ is generated from the flux modulation unit 21 and induces the voltage Vf in the reception winding portion 14.

Further, if the slider 1 moves by a half pitch ($\lambda/2$) and the negative-polarity loop 11L− of the transmission winding portion 11 overlaps the flux modulation unit 21 of the scale 2, a magnetic flux in a direction canceling the magnetic flux which is generated from the negative-polarity loop 11L− is generated from the flux modulation unit 21 and induces the voltage Vf in the reception winding portion 14.

The polarities (positive and negative of the voltage Vf) are opposite to each other. That is, with respect to the movement of the position X, the voltage Vf which is induced in the reception winding portion 14 sinusoidally repeats positive and negative values in the period $\lambda$.

If the induced voltages by the first transmission winding 12 and the second transmission winding 13 are matched, the following expression (3) is obtained.

$$Vf=K(g)I\{-\sin(2\pi\alpha/\lambda)\cos(2\pi X/\lambda)+\cos(2\pi\alpha/\lambda)\sin(2\pi X/\lambda)\}\sin(\omega t)$$

$$=K(g)|\sin(2\pi(X-\alpha)/\lambda)\sin(\omega t) \qquad (3)$$

(K: coefficient depending on the gap g between the slider 1 and the scale 2, X: position of the scale 2)

In the control unit 18, the parameters α of the electric currents Is and Ic are adjusted such that the voltage Vf becomes zero. In this way, position detection is performed by making the position X equal to α.

Further, as already described, the dispositions of the positive-polarity loop 11L+ and the negative-polarity loop 11L− on both sides with respect to the intermediate position in the longitudinal direction of the transmission winding portion 11 are in a mutually inverted state, and therefore, in the first transmission winding 12, the magnetic flux which is generated from the flux modulation unit 21 when the positive-polarity loop 11L+ overlaps the flux modulation unit 21, and the magnetic flux which is generated from the flux modulation unit 21 when the negative-polarity loop 11L− overlaps the flux modulation unit 21 have opposite polarities, and a magnetic field changes with positive and negative values in which the average is zero, and thus a large offset mentioned in (2) as the problem of the related art does not occur.

In this way, it is not necessary to perform measurement of the gap g by separately providing a detection device due to a change of the offset according to the gap g, unlike the related art.

In the slider 1, not only the dispositions of the positive-polarity loop 11L+ and the negative-polarity loop 11L− are inverted, but also the corresponding reception loop 14AL and reception loop 14BL also have symmetric shapes, and therefore, the induced voltage Vf is not offset and it is possible to perform the position detection.

Further, when the positive-polarity loop 11L+ overlaps the flux modulation unit 21 in the first transmission winding 12, the negative-polarity loop 11L−overlaps the flux modulation unit 21 in the second transmission winding 13, and therefore, if the voltage by the first transmission winding 12 and the voltage by the second transmission winding 13 are combined, the offset is further reduced.

Since the electric currents Is and Ic are adjusted such that the voltage Vf becomes zero, the total of the magnetic fluxes which are generated on the scale 2 is adjusted to zero.

Further, the magnetic field by the transmission winding portion 11 directly induces voltage not only in the flux modulation unit 21 but also in the reception winding portion 14. However, since the reception winding portion 14 is inverted in polarity between the first reception winding 14A and the second reception winding 14B, the offset mentioned in the above (1) in the related art can also be reduced.

The electromagnetic induction type position detector according to this example has been described above. However, this example does not limit the periodic patterns of the first transmission winding 12 and the second transmission winding 13 to the sinusoidal waveform as described above. A periodic pattern other than the sinusoidal waveform is established as long as the positive-polarity loop 11L+ and the negative-polarity loop 11L− which are formed by the periodic patterns have an elliptical shape, a rhombic shape, or an intermediate shape between them.

In this way, in this example, it is possible to reduce the offset of the induced voltage and achieve higher accuracy.

Further, in this example, unlike PTL 1, it is not necessary to provide transmission winding portions having symmetrical shapes outside the positive-polarity loop and the negative-polarity loop, and therefore, compactification can be achieved. Further, in this example, only the flux modulation unit is formed on the scale side and wiring on the scale side is not required.

INDUSTRIAL APPLICABILITY

The present invention is suitable as an electromagnetic induction type position detector.

REFERENCE SIGNS LIST

1: slider
2: scale
11: transmission winding portion
11L+: positive-polarity loop
11L−: negative-polarity loop
12: first transmission winding
13: second transmission winding
14: reception winding portion
14A: first reception winding
14B: second reception winding
14AL: reception loop
14BL: reception loop
15A: interlayer connection wire
15B: interlayer connection wire
16: first alternating-current power supply
17: second alternating-current power supply
18: control unit
21: flux modulation unit

The invention claimed is:
1. An electromagnetic induction type position detector comprising:
   a primary-side member having a transmission winding portion which generates a magnetic field by an electric current which is provided from an alternating-current power supply, and a reception winding portion which is disposed so as to overlap the transmission winding portion with an insulating layer interposed therebetween;
   a secondary-side member having a flux modulation unit that generates an induced voltage in the reception winding portion by an eddy current which is generated by the magnetic field of the transmission winding portion; and
   a control unit that performs position detection, based on the induced voltage,
   wherein the transmission winding portion has
   a first transmission winding having a shape in which a periodic pattern extending toward one side in an extending direction of the secondary-side member is folded at an end portion of a predetermined period to form a positive-polarity loop and a negative-polarity loop, and
   a second transmission winding which overlaps the first transmission winding with an insulating layer interposed therebetween and has a shape in which a periodic pattern extending toward the other side in the extending direction of the secondary-side member and having the same period as the periodic pattern of the first transmission winding is folded at an end portion of a predetermined period to form the positive-polarity loop and the negative-polarity loop, the positive-polarity loop and the negative-polarity loop are alternately formed while partially overlapping each other in the extending direction of the secondary-side member, with the first transmission winding being adjusted such that dispositions of the positive-polarity loop and the negative-polarity loop on both sides with respect to an intermediate position in a longitudinal direction of the first transmission winding itself are inverted to each other, and the second transmission winding being adjusted such that dispositions of the positive-polarity loop and the negative-polarity loop on both sides with respect to an intermediate position in a longitudinal direction of the second transmission winding itself are inverted to each other, the reception winding portion has a first reception winding formed in a rectangular pattern which covers the transmission winding portion in a width direction of the secondary-side member and has a length corresponding to a period of the periodic pattern of each of the first transmission winding and the second transmission winding in the extending direction of the secondary-side member, and a second reception winding having a shape symmetrical to the first reception winding with the intermediate position in the longitudinal direction of the transmission winding portion as a center, and connected to the first reception winding, a plurality of the flux modulation units are arranged in the extending direction of the secondary-side member and face the transmitting winding portion and the reception winding portion, and the alternating-current power supply has a first alternating-current power supply which supplies an electric current Is to the first transmission winding, and a second alternating-current power supply which supplies an electric current Ic to the second transmission winding.

2. The electromagnetic induction type position detector according to claim 1, wherein a period of the periodic pattern of each of the first transmission winding and the second transmission winding is set to be n$\lambda$, the first transmission winding and the second transmission winding overlap each other so as to be shifted from each other by a quarter period, the plurality of flux modulation units are arranged every $\lambda$, the electric current Is is set to be Is=−Isin(2$\pi\alpha$/$\lambda$)sin($\omega$t), the electric current Ic is set to be Ic=Icos(2$\pi\alpha$/$\lambda$)sin($\omega$t), and the control unit controls the first alternating-current power supply and the second alternating-current power supply and performs the position detection by adjusting a such that the induced voltage Vf becomes zero and making X equal to $\alpha$;

here, Is is magnitude of the electric current Is, Ic is magnitude of the electric current Ic, $\lambda$ is a length of one pitch of the flux modulation unit, $\omega$ is an angular frequency of an alternating current, t is a time, and $\alpha$ is a parameter.

3. The electromagnetic induction type position detector according to claim 2, wherein the periodic pattern of each of the first transmission winding and the second transmission winding is formed such that interlayer connection wires penetrating the insulating layer are provided at positions corresponding to a maximum value and a minimum value and a folded position of an end portion and a transition from an N-th layer to an N+1-th layer and a transition from the N+1-th layer to the N-th layer are alternately performed at the interlayer connection wires.

* * * * *